C. M. HOOVER.
MILLING MACHINE BLADE.
APPLICATION FILED MAY 9, 1914.

1,125,537.

Patented Jan. 19, 1915.

Witnesses
Robert Karcher
J. H. Bishop

Inventor
Clyde M. Hoover.
By F. W. Bond
Attorneys

UNITED STATES PATENT OFFICE.

CLYDE M. HOOVER, OF COLUMBIANA, OHIO.

MILLING-MACHINE BLADE.

1,125,537.   Specification of Letters Patent.   Patented Jan. 19, 1915.

Application filed May 9, 1914. Serial No. 837,376.

*To all whom it may concern:*

Be it known that I, CLYDE M. HOOVER, a citizen of the United States, residing at Columbiana, in the county of Columbiana and State of Ohio, have invented a new and useful Milling-Machine Blade, of which the following is a specification.

My invention relates to improvements in milling machine blades, such as are used in milling cutters, in which the body of the cutter consists of a disk carried by the spindle of the milling machine and provided around its periphery with a plurality of cutter blades. In milling cutters of this construction the disk body of the cutter is provided with a series of notches around its periphery, said notches being adapted to accommodate the cutter blades which are composed of high speed steel. This form of cutter blade is especially adapted to be used in a face mill where it is often necessary to take a heavy cut upon the face of the casting which is being milled, and as a result the corners of the blades soon become dull and have to be re-ground and with continued use the life of the blade is comparatively short. The blades, such as are used at present in these cutters, extend straight across the full width of the disk and as soon as the cutting corner of the blade becomes worn the blade must be replaced by a new one.

It is the object of my invention to provide a reversible blade which may be removed from the disk when the cutting corner becomes sufficiently worn and replaced therein with a new cutting corner presented to the face of the work.

A further object is to provide a cutter blade which will be easier to grind than the type of blade such as used at present.

A still further object is to provide a blade which may be easily and quickly detached from the disk and reinserted therein.

These objects, together with other objects readily apparent to those skilled in the art, may be attained by the construction illustrated in the accompanying drawings, although the invention may be embodied in other forms, the construction illustrated being chosen by way of example.

Figure 1:
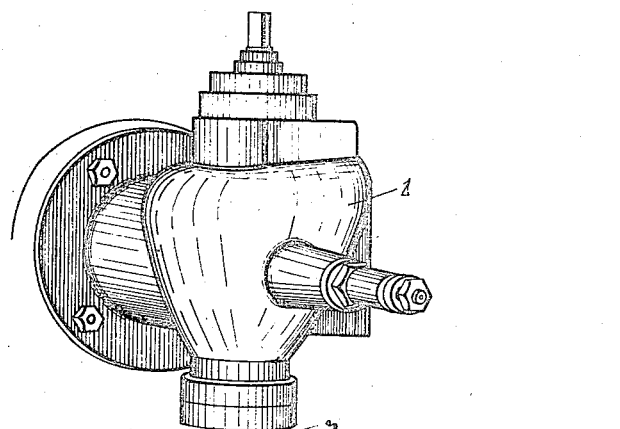
Figure 5:
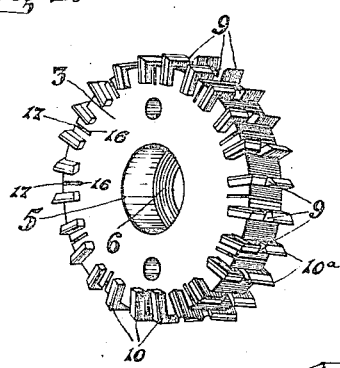
Figures 2, 3, 4:
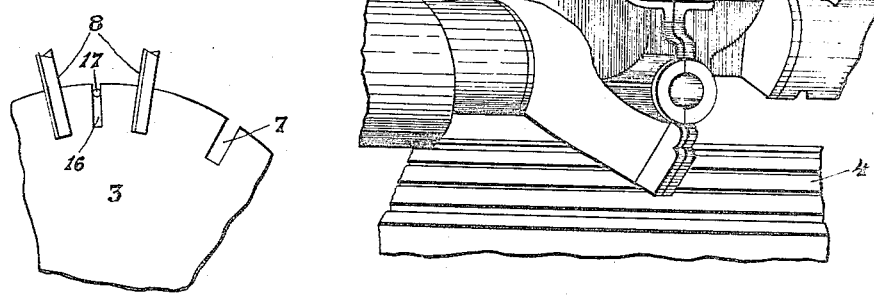

In the drawings; Figure 1 is a perspective view of a mill of the vertical spindle type, showing the disk provided with my cutter blades. Fig. 2 is a detached perspective view of the disk provided with my cutter blades. Fig. 3 is a detailed perspective view of one of the blades. Fig. 4 is an edge view of the same. Fig. 5 is a fragmentary view of the disk, showing the means retaining the cutter blades therein.

Similar numerals of reference indicate corresponding parts throughout the several views.

A portion of a face mill is indicated by the numeral 1, the vertical spindle 2 being provided with the disk 3. The bed 4 of the mill is provided with the usual means (not shown) for clamping the work, such as the casting indicated by A in the drawing, and the usual means are provided for bringing said work into contact with the cutter. This construction being of the usual form will be readily understood by one skilled in the art and needs no further description.

The disk 3 is provided with the central aperture 5, which is shown in the drawings, as having the internal screw threads 6 adapted to receive the lower extremity of the spindle 2 which is usually screw threaded, but this method of attaching the cutter proper to the spindle is not essential, as any well known manner of attaching and detaching the cutter may be used.

The disk 3 is provided around its periphery with a series of notches 7, adapted to receive the cutter blades 8, each of said blades being substantially of the form shown more clearly in Figs. 3 and 4 of the drawings. Each of the blades 8 is of substantially the same length as the blades now in use, and each blade is provided with a notch 9 in its outer edge, the notch 9 being preferably centrally located, said notch dividing the blade into two distinct cutting surfaces. Thus a left and a right cutting edge 10 and 10$^a$ is provided upon each blade, each of said cutting edges being ground with the usual bevel 11 and 11$^a$, respectively, and the clearance 12 and 12$^a$ being provided for each cutting edge. The outer edge of each blade being divided by the notch 9 left and right cutting edges 13 and 13$^a$, respectively, are formed, and each of these edges being provided with the bevel 14 and 14$^a$, respectively, and the clearance 15 and 15$^a$, respectively.

Located in the periphery of the disk 3, intermediate the cutter receiving notches 7, and preferably occurring between each alternate pair of said notches 7, is a second series of notches 16, the use of which will be hereinafter described. The blades 8 are inserted in the notches 7 of the disk, as shown more clearly in Figs. 2 and 5 of the drawings, and a pin 17 is inserted longitudinally in each of the notches 16 and forced into said notch, with any suitable instrument, thus spreading the metal in the disk 3, away from the notch 16 and tending to contract the blade receiving notches 7, thus retaining the blades 8 firmly in the periphery of the disk 3. When the cutting corner 18 of the blade has become worn, the pin 17, which retains said blade in its notch in the disk 3, may be easily dislodged from the notch into which it has been forced, allowing the blade 8 to be removed and reversed, thus presenting the cutting corner 18$^a$.

In the drawings the blade is shown as used on a cutter in a mill of the vertical spindle type, but it is to be understood that a horizontal spindle, or in fact any kind of a milling machine for face mill work, may be provided with this form of cutter blade.

Although the drawings and above specification disclose the best mode in which I have contemplated embodying my invention, I desire to be not limited to the details of such disclosure, for many changes in form and construction may be made, as circumstances require or experience suggests, without departing from the spirit of the invention, within the scope of the appended claims.

I claim:—

1. A blade for milling machines provided upon its forward edge with two oppositely disposed beveled cutting edges.

2. A blade for milling machine cutters provided with a notch dividing the forward edge of said blade into two oppositely disposed cutting edges.

3. In a milling machine, the combination with a spindle, of a rotary disk, a series of cutting blades located around the periphery of said disk, each of said cutting blades provided upon its forward edge with two oppositely disposed beveled cutting edges and means for retaining said plates in said disk.

4. A blade for milling machines provided upon its forward edge with two oppositely disposed beveled cutting edges, each of said beveled cutting edges extending less than half of the entire length of the blade, the edges of said blade, adjoining said forward edge, being provided with oppositely disposed beveled cutting edges, forming two oppositely disposed cutting corners upon the blade.

5. In a milling machine, the combination with a spindle, of a rotary disk, a series of cutting blades located around the periphery of said disk, each of said blades provided upon its forward edge with two oppositely disposed beveled cutting edges, each of said beveled cutting edges extending less than half of the entire length of the blade, and means for retaining said blades in said disk.

In testimony that I claim the above, I have hereunto subscribed my name in the presence of two witnesses.

CLYDE M. HOOVER.

Witnesses:
S. S. WEAVER,
LOTTIE HOOVER.